(12) United States Patent
Mikkelsen et al.

(10) Patent No.: US 6,556,323 B1
(45) Date of Patent: Apr. 29, 2003

(54) DEMULTIPLEXING AND CLOCK-RECOVERY CIRCUIT

(75) Inventors: Benny Peter Mikkelsen, Atlantic Highlands, NJ (US); Gregory Raybon, Shrewsbury, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/505,328

(22) Filed: Feb. 16, 2000

Related U.S. Application Data

(60) Provisional application No. 60/120,364, filed on Feb. 17, 1999.

(51) Int. Cl.[7] .......................... H04B 10/00; H04B 10/04
(52) U.S. Cl. ...................... 359/158; 359/154; 359/187; 359/180; 359/181
(58) Field of Search ................................ 359/158, 154, 359/187, 135, 138, 180, 181

(56) References Cited

U.S. PATENT DOCUMENTS 5,710,649 A * 1/1998 Mollenauer .................. 359/123
6,486,990 B1 * 11/2002 Roberts et al. ............. 359/135

* cited by examiner

*Primary Examiner*—Leslie Pascal
*Assistant Examiner*—David C. Payne
(74) *Attorney, Agent, or Firm*—David A. Sasso

(57) ABSTRACT

An optical element for simultaneously retrieving the tributary data rate and the clock frequency from the line rate of an OTDM signal. The demultiplexing and clock recovery principle is based on injection locking of a high-Q-filtered and high gain loop with a variable phase delay and an EA-modulator with high non-linear response, i.e., absorption verses applied voltage. A modulator that is preferably an EA-modulator, an amplifier preferably an erbium doped fiber amplifier ("EDFA"), a base band receiver, an electronic amplifier, a high-Q filter, and a variable phase delay are arranged in a loop to provide an oscillator for simultaneously retrieving tributary data rate and clock frequency.

13 Claims, 3 Drawing Sheets

- ● 100 Gb/s OVER 160 KM, +3 dBm LAUNCH POWER
- ○ 100 Gb/s OVER 160 KM, +5 dBm LAUNCH POWER
- ■ 100 Gb/s BACK-TO-BACK SENSITIVITY

DEMULTIPLEXING AND CLOCK-RECOVERY CIRCUIT

CROSS-REFERENCE TO RELATED APPLICATIONS

The present application claims benefit of the filing date of U.S. Patent Application No. 60/120,364 entitled SIMULTANEOUS DEMULTIPLEXING AND CLOCK-RECOVERY CIRCUIT, filed on Feb. 17, 1999.

DESCRIPTION

1. Technical Field of the Invention

The present invention relates in general to circuits, and more particularly to a demultiplexing and clock recovery circuit for high data rate signals.

2. Background of the Invention

Optical time division multiplexing ("OTDM") is a desirable technique for increasing the fiber transmission capacity beyond the limits set by the bandwidth of transmitter and receiver electronics. In this technique, a high line rate OTDM signal is generally realized by bit interleaving a number, n, of tributary signals of lower data rate, ft.

As generally known to those skilled in the art, optical demultiplexers and clock recovery circuits are important elements in OTDM systems for retrieving the tributary rate ("ft"), from the line rate ("n*ft"), as well as the tributary clock frequency at ft.

The prior art OTDM techniques generally use separate elements to perform demultiplexing and clock recovery. For example, electro-absorption ("EA") modulators are predominantly used for demultiplexing because they have proven to be very efficient as optical demultiplexers of high data rate OTMD signals, whereas clock recovery has been based on the nonlinear response of semiconductor optical amplifiers in combination with electronic phase locked loops. Alternatively, injection locking of lasers have been utilized for clock recovery.

Some of the disadvantages associated with using separate elements or devices for demultiplexing and clock recovery may be an increase in the amount of components that may result in a more costly and complicated system such that systems may further have an increased rate of failure.

Therefore, it is highly desirable to have a single device that can both demultiplex data signals as well as recover clock frequency of those data signals.

SUMMARY OF THE INVENTION

To overcome the shortcomings of the existing prior art devices, the present invention is directed to an optical element that can retrieve the tributary data rate and the clock frequency from the line rate of an OTDM signal. In the present invention, the demultiplexing and clock recovery principle is based on injection locking of a high-Q-filtered and high gain loop with a variable phase delay and an EA-modulator with high non-linear response, i.e., absorption verses applied voltage.

In accordance with the goals of the present invention, there is provided a modulator that is preferably an EA-modulator, an optical amplifier preferably an erbium doped fiber amplifier ("EDFA") or a semiconductor optical amplifier ("SOA"), a base band receiver, an electronic amplifier, a high-Q filter, and a variable phase delay. The bandwidth of the basic elements need not exceed the tributary signals of lower data rate, ft.

An aspect of the present invention includes a non-linear modulator for receiving a tributary signal, a first optical amplifier coupled to the non-linear modulator for amplifying the multiplexed signal. A baseband receiver is coupled to the first amplifier, the baseband receiver for converting the received optical signal to an electrical signal. An electronic amplifier coupled to the baseband receiver amplifies the received signal, and a high-Q filter coupled to the electronic amplifier retrieves signal of selected frequency range. A variable phase delay coupled to the high-Q filter, and also to the non-linear modulator, adjusts clock signal phases in the selected frequency range to recover clock frequency. The phase corrected signal from the high-Q filter is also fed back to the non-linear modulator.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

The embodiments of the present invention will now be described, by way of example only, with reference to the accompanying drawings in which.

DETAILED DESCRIPTION OF THE INVENTION

Figure 1:
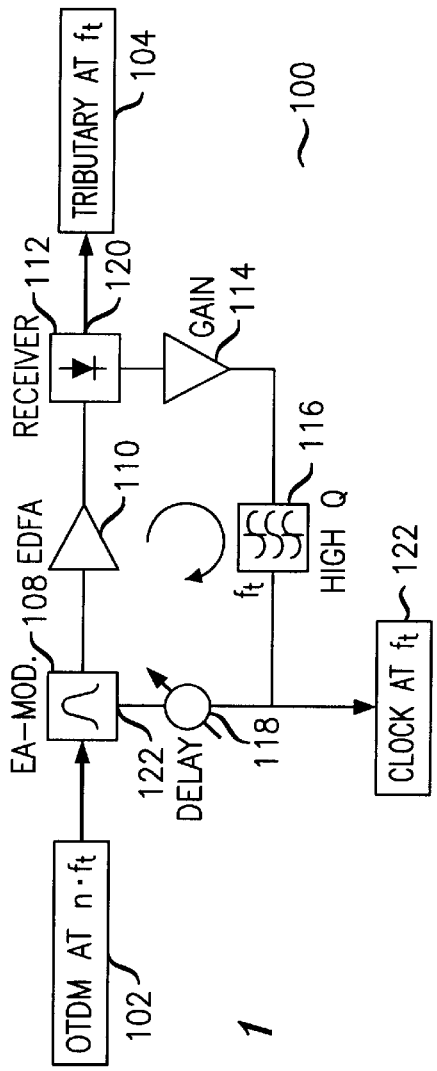
FIG. 1 illustrates an embodiment of the optical demultiplexer and clock recovery circuit of the present invention in one embodiment.

FIG. 1 illustrates an optical demultiplexer and clock recovery circuit 100 in one embodiment of the present invention. The circuit shown in FIG. 1 is based on an injection locked electro-optic oscillator using an EA modulator as a nonlinear element. The OTDM signal 102 that is to be demultiplexed from the line rate of n*ft to the tributary rate ft is coupled to a modulator.

The circuit shown in FIG. 1 is an electro-optic oscillator that includes an EA-modulator 108 coupled to an EDFA 110. The EA-modulator 108 provides a tributary signal to an amplifier based on the OTDM signal 102 and a delay filtered signal 122. The EDFA 110 is coupled to a receiver 112. The EDFA 110 is used to amplify the tributary signal. The receiver 112 outputs a demultiplexed tributary rate, ft as shown at 104. The receiver 112 is also coupled to an electronic amplifier 114 and also transmits an output signal to an amplifier 114. In this embodiment, the amplifier 114 is used to amplify the output signal provided by the receiver 120. The amplifier 114 is coupled to a high-Q filter 116. The high-Q filter 116 is generally used to select a desired frequency band. In this embodiment of the present invention, the high-Q filter is used to limit the oscillating frequency to the desired tributary frequency. The high-Q filter 116 is coupled to a variable phase delay 118. The variable phase delay 118 adjusts the phase in the loop such that the feedback portion of the output signal is in correct phase and amplitude for obtaining oscillation at a desired frequency. In an exemplary embodiment, an electronic amplifier similar to the one shown at 114 can also be inserted after the high-Q filter.

The oscillator 100 shown in FIG. 1, generally oscillates at the frequency with the highest gain or lowest threshold. Consequently, the oscillator 100 oscillates at the tributary frequency because the gain within the loop is highest when the frequency of the oscillator coincide with the tributary frequency of the data signal.

In the present invention, oscillator 100 is initiated by the OTDM signal 102 and by having sufficiently high gain in the loop. In an exemplary embodiment, an EDFA 110 or SOA in combination with electronic amplifier 114 preferably provides the gain.

Figure 2:
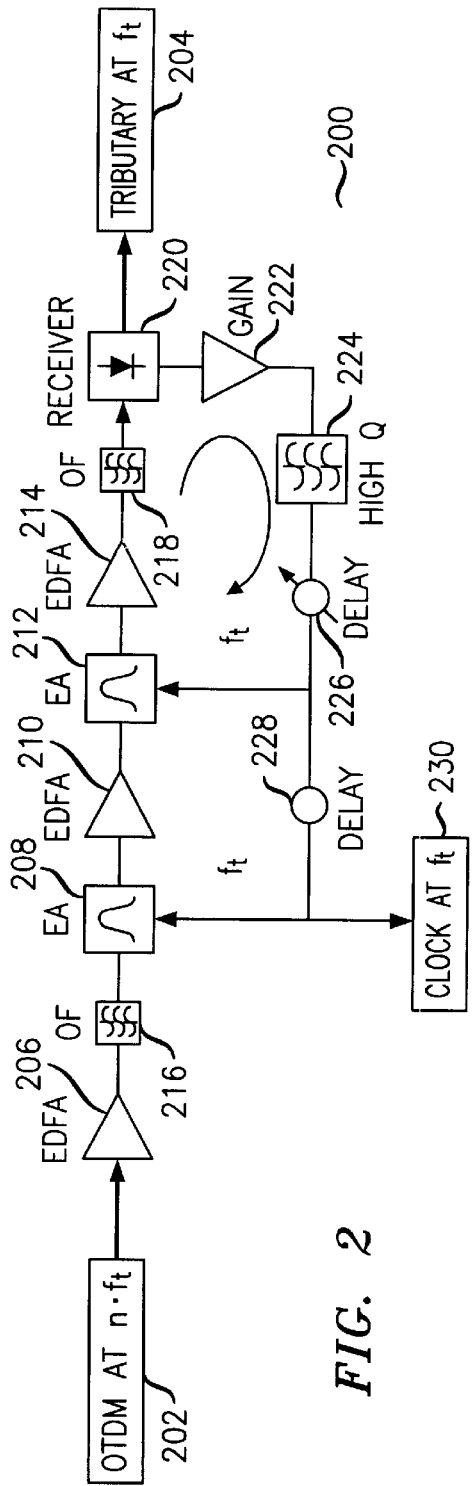
FIG. 2 illustrates an embodiment of the simultaneous demultiplexing and clock recovery circuit having cascaded nonlinear element.

FIG. 2 illustrates an embodiment of the simultaneous demultiplexing and clock recovery circuit 200 having cascaded nonlinear element. As shown, the EDFA 206, OF 216, EA 208, EDFA 210, EA 212, EDFA 214, OF 218, are arranged in cascaded configuration. In an exemplary embodiment, the EDFA 206 pre-amplifies the OTDM signal 102. The EDFA 210, 214 provide gain in the loop for the tributary signal provided by the EA 208, 212. For enabling simultaneous demultiplexing and clock recovery, the non-linear element, e.g., EA modulators 208, 212 produce a narrow switching window. By cascading EA modulators 208, 212, or any nonlinear element, as shown in FIG. 2, this narrow switching window is effected. More specifically, the output from the variable phase delay 226 is divided and input to both the EA modulator 212 and the variable phase delay 228. The divided signal to the EA modulator 212 is amplified at 214, filtered by the optical filter at 218 and input to the base band receiver 220 where the tributary data frequency 204 is retrieved. The divided signal is also received at the variable phase delay 228 where the clock frequency 230 is recovered. At the same time, the phase corrected signal from the variable phase delay 228 is fed back to the EA modulator 208. This feed back signal to the EA 208 may be a harmonic of the tributary frequency, obtained, e.g., by a frequency doubler.

Figure 3:
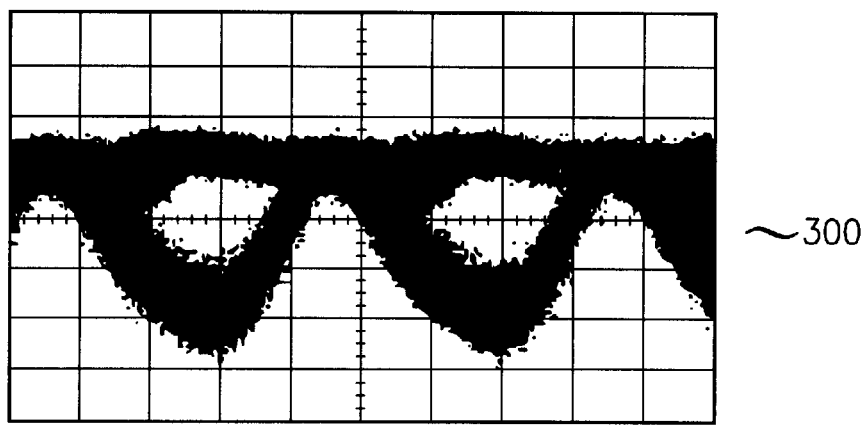
FIG. 3 illustrates a recorded eye-diagram of a demultiplexed tributary signal.
Figure 4:
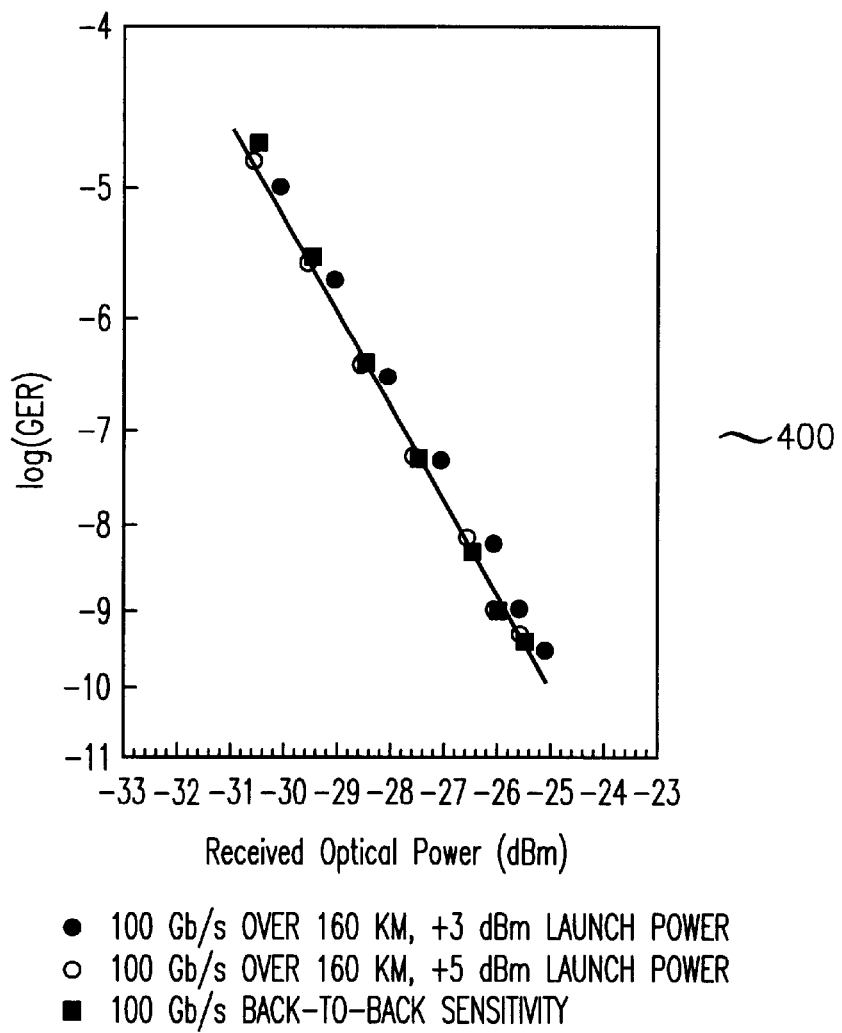
FIG. 4 shows bit error rate measurements after demultiplexing from 100 to 10 Gbit/sec and using the recovered 10 GHz clock to trigger the error detector.

FIG. 3 shows a recorded eye-diagram of a demultiplexed tributary signal at 10 Gbit/s using the simultaneous demultiplexing and clock recovery circuit 200 shown in FIG. 2. FIG. 4 shows Bit error rate measurements after demultiplexing from 100 to 10 Gbit/s and using the recovered 10 GHz clock to trigger the error detector.

Figure 5:
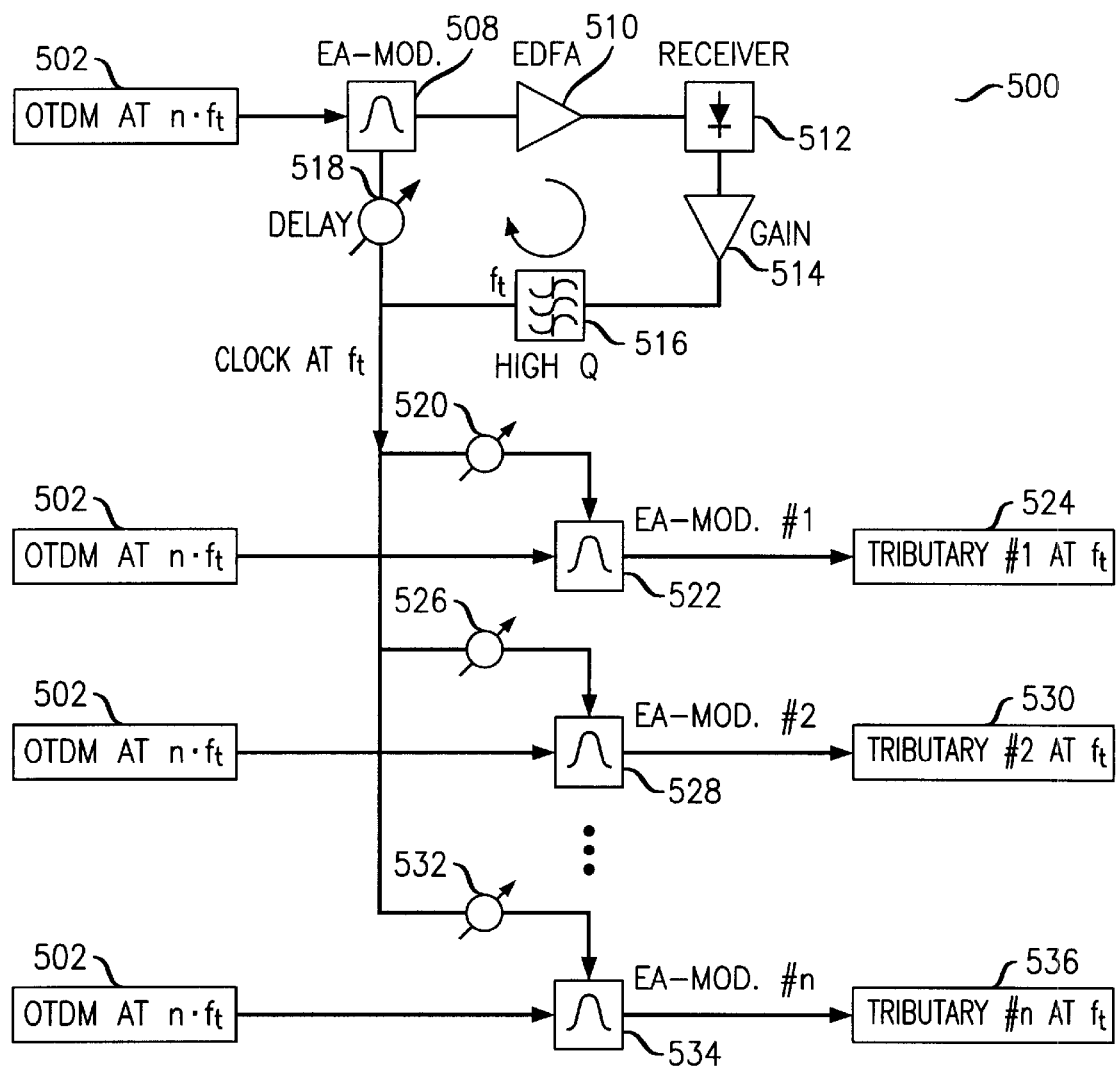
FIG. 5 illustrates an embodiment of the demultiplexing and clock recovery circuit having a plurality of variable phase delay and EA modulator pairs for demultiplexing multiple tributary data frequency.

FIG. 5 illustrates an embodiment of the demultiplexing and clock recovery circuit 500 having a plurality of variable phase delay and EA modulator pairs for demultiplexing multiple tributary data frequency. The circuit 500 includes a modulator 508, preferably an EA modulator, coupled to an amplifier 510 that is preferably an EDFA or SOA, the amplifier 512 coupled to a receiver 512. The receiver 512 is coupled to a second amplifier 514. The second amplifier 514 is coupled to a high-Q filter 516. The high-Q filter 516 is coupled to a variable phase delay 518. The output from the variable phase delay 518 may be amplified by an electric amplifier or coupled directly to the EA modulator 508. The circuit also includes a plurality of phase delay and EA-modulator pairs 520/522, 526/528, 532/534 which when combined with the clock frequency signal retrieved from the high-Q filter 516 and the OTDM signal, outputs tributary data signals 524, 530, 536. More specifically, the clock frequency output from the high-Q filter 516 is input to the variable phase delays 520, 526, 532 for outputting the clock frequency signal in a correct phase. The phase corrected clock frequency signal is then input to the EA-modulator 522, 528, 534 with the OTDM signals 502. The respective EA-modulators 522, 528, 534 outputs the tributary data rates at 524, 530, 536, allowing the line rate ("n*ft") to be demultiplexed into its n tributary data signals.

While the invention has been particularly shown and described with respect to an embodiment thereof, it will be understood by those skilled in the art that the foregoing and other changes in form and details may be made therein without departing from the spirit and scope of the invention.

What is claimed is:

1. A demultiplexing and clock frequency-recovery circuit comprising:

a non-linear modulator for providing a tributary signal from a received signal;

an optical amplifier coupled to the non-linear modulator to amplify the received signal;

a baseband receiver coupled to the optical amplifier, the baseband receiver for converting the received signal into an electric signal;

an amplifier coupled to the baseband receiver for amplifying the received signal;

a high-Q filter coupled to the amplifier for filtering a signal of selected frequency range; and a variable phase delay coupled to the high-Q filter and the non-linear modulator, the variable phase delay for adjusting phase in the filtered signal of selected frequency range and feeding the phase adjusted filtered signal back to the non-linear modulator, wherein the baseband signal frequency and clock frequency are recovered.

2. The circuit of claim 1, wherein the optical amplifier includes an erbium doped fiber amplifier.

3. The circuit of claim 1, wherein the non-linear modulator includes an electro-absorption modulator.

4. The circuit of claim 1, wherein the non-linear modulator includes an electro-optic modulator.

5. The circuit of claim 1, wherein the non-linear modulator includes a semiconductor optical amplifier.

6. The circuit of claim 1, wherein the non-linear modulator includes a plurality of non-linear modulators arranged as a cascade of modulators.

7. The circuit of claim 6, wherein a harmonic of a tributary frequency signal is fed back to one of the plurality of non-linear modulators.

8. A demultiplexing and clock-recovery circuit comprising:

a non-linear modulator for providing a tributary signal from a received signal;

an optical amplifier coupled to the non-linear modulator to amplify the received signal;

a baseband receiver coupled to the optical amplifier;

an amplifier coupled to the amplifier for extracting a signal of selected frequency range from the received signal; and a variable phase delay coupled to the high-Q filter, the variable phase delay further coupled to the non-linear modulator, the variable phase delay for correcting phase of the signal output from the high-Q filter and feeding back the phase corrected signal to the non-linear modulator; and a plurality of phase delay and second non-linear modulator pair coupled to the high-Q filter for outputting a plurality of tributary data signals.

9. The circuit of claim 8, wherein the first amplifier includes an erbium doped fiber amplifier.

10. The circuit of claim 8, wherein the non-linear modulator includes an electro-absorption modulator.

11. The circuit of claim 7, wherein the non-linear modulator includes a semiconductor optical amplifier.

12. The circuit of claim 7, wherein at least one other non-linear modulator of the plurality of non-linear modulator include electro-absorption modulators.

13. The circuit of claim 7, wherein a harmonic of a tributary frequency signal is fed back to the non-linear modulators.

* * * * *